United States Patent [19]
Halling et al.

[11] Patent Number: 4,854,600
[45] Date of Patent: Aug. 8, 1989

[54] PRESSURE BALANCED METALLIC S-SEAL

[75] Inventors: Horace P. Halling, Laurel; Robert A. Barrett, Crofton; Mark E. Woozley, Beltsville, all of Md.

[73] Assignee: EG&G Pressure Science, Inc., Beltsville, Md.

[21] Appl. No.: 233,019

[22] Filed: Aug. 17, 1988

Related U.S. Application Data

[62] Division of Ser. No. 5,954, Jan. 21, 1987, Pat. No. 4,813,692.

[51] Int. Cl.$^4$ ............... F16J 15/28; F16J 15/08
[52] U.S. Cl. ............... 277/236; 277/200; 277/205
[58] Field of Search .......... 277/200, 205, 207 R, 277/211, 213, 206 R, 236

[56] References Cited

U.S. PATENT DOCUMENTS

| | | | |
|---|---|---|---|
| 2,213,414 | 9/1940 | Simpson | 277/236 X |
| 3,099,456 | 7/1963 | Hopp | 277/236 X |
| 3,285,632 | 11/1966 | Dunkle | 277/236 X |
| 3,482,302 | 12/1969 | Williams | 277/200 X |
| 3,490,777 | 1/1970 | Emmerson | 277/236 X |
| 3,575,432 | 4/1971 | Taylor | 277/206 R |
| 3,797,836 | 3/1974 | Halling | 277/200 |
| 3,857,572 | 12/1974 | Taylor et al. | 277/206 R |
| 3,869,132 | 3/1975 | Taylor et al. | 277/26 |
| 4,067,585 | 1/1978 | Rode | 277/236 X |
| 4,121,843 | 10/1978 | Halling | 277/206 R X |
| 4,168,839 | 9/1979 | Hopp et al. | 277/236 X |
| 4,241,491 | 12/1980 | Hopp | 277/236 X |
| 4,457,523 | 7/1984 | Halling et al. | 277/206 R X |

FOREIGN PATENT DOCUMENTS

| | | | |
|---|---|---|---|
| 730561 | 3/1966 | Canada | 277/236 |
| 813226 | 5/1969 | Canada | 277/236 |
| 2909223 | 10/1979 | Fed. Rep. of Germany | 277/236 |
| 52-56254 | 5/1977 | Japan | 277/200 |
| 52-56255 | 5/1977 | Japan | 277/200 |

*Primary Examiner*—Robert S. Ward
*Attorney, Agent, or Firm*—Roylance, Abrams, Berdo & Goodman

[57] ABSTRACT

A pressure balance sealing ring having a substantially S-shaped, resilient cross section including two oppositely facing convolutions, a central leg coupling the convolutions and a pair of outer legs, each extending from one of the convolutions. The ring is advantageously formed of metal and seals against opposed axially facing but offset surfaces in an annulus between two concentric pipes or opposed axially facing surfaces at the interface formed by two aligned pipes. Each outer leg has a substantially circular sealing line, these sealing lines being radially offset from one another, adjacent the free distal edge of each leg, and spaced from the convolutions. In a modified embodiment, the sealing ring has more than two convolutions and additional legs to connect them. In another series of modified embodiments, the sealing ring has one or two restraining rings rigidly coupled to one or both of the outer legs to ensure the desired direction of torsional deflection under the action of the differential pressure. The sealing ring can also have its sealing lines axially offset as an alternative to them being radially offset.

8 Claims, 4 Drawing Sheets

HIGH PRESSURE AREA 50

LOW PRESSURE AREA 52

PRESSURE BALANCED METALLIC S-SEAL

This is a division of application Ser. No. 07/005,954 filed Jan. 21, 1987, now U.S. Pat. No. 4,813,692.

FIELD OF THE INVENTION

The invention relates to sealing rings used to seal against axially or radially facing but offset surfaces in an annulus between two concentric pipes or axially facing surfaces at the interface formed by two aligned pipes. More specifically, the invention relates to a pressure balanced sealing ring formed of metal and having a substantially S-shaped cross section.

BACKGROUND OF THE INVENTION

There are many applications, such as ducting systems and housings in gas turbine engines, where it is essential or desirable to affect sealing between annular components that are at variable axial distances from one another due to manufacturing tolerances on several components in the assembly and thermal expansion and contraction during operation of the engine. Typically, metallic, resilient sealing rings are used to seal against opposed axially or radially facing surfaces in the annulus between two concentric pipes or in opposed axially facing surfaces at the interface of two aligned pipes to confine high temperature and pressure fluids located in the pipes.

While there are numerous sealing rings known in the art for confining fluids at high temperatures and pressures, they have various disadvantages. For example, some of these sealing rings cannot vary substantially in length and others loose their resiliency after a limited number of pressure and thermal deflection cycles. In addition, many of these sealing rings are affected by the high pressures they experience and become unbalanced and therefore subject to leakage. Other seals cannot provide sealing against axially facing but radially offset surfaces and some seals can only accommodate compressive deflection by the bending of their cross sections and not by torsional deflection, i.e., twisting, of the cross section. Finally, many of these prior sealing rings are formed from very thin metal and therefore tend to dent during manufacture, handling and assembly.

Examples of these prior sealing rings are disclosed in the following U.S. Pat. Nos.: 3,285,632 to Dunkle; 3,575,432 to Taylor; 3,797,836 to Halling; 3,857,572 to Taylor et al; 3,869,132 to Taylor et al; 4,121,843 to Halling; and 4,457,523 to Halling et al.

Thus, there is a continuing need for improvement in metallic sealing rings for use at high temperatures and pressures which are subject to large axial variations and repeated pressure and thermal deflection cycles.

SUMMARY OF THE INVENTION

Accordingly, a primary object of the invention is to provide a sealing ring that confines fluids at high temperatures and pressures, can accommodate large variations in installed length, and remain effective after a large number of pressure and thermal deflection cycles.

Another object of the invention is to provide a sealing ring that is pressure balanced and therefore resists leakage under high pressure.

A further object of the invention is to provide a sealing ring that can seal against opposed axially or radially facing but offset surfaces as well as opposed axially facing and aligned surfaces.

A further object of the invention is to provide a sealing ring that can accommodate axial compression and expansion by the torsional deflection of its cross section, as well as by bending.

A further object of the invention is to provide a sealing ring that can be made of relatively heavy stock to resist dents.

The foregoing objects are basically attained by providing a sealing ring, the combination comprising a ring having a longitudinal axis and a resilient and continuous cross section, the cross section comprising a first convolution, a second convolution, a first leg extending from the first convolution and having a first free distal edge, a second leg extending from the first convolution to the second convolution, and a third leg extending from the second convolution and having a second free distal edge, the first convolution being offset from the second convolution, the first leg having an outer surface defining a first substantially circular sealing line facing in a first direction and being spaced from the first convolution, the third leg having an outer surface defining a second substantially circular sealing line facing in a second direction opposite the first direction and being spaced from the second convolution, the second sealing line being offset from the first sealing line.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 1 is a fragmentary, top plan view in longitudinal section of the pressure balanced sealing ring in accordance with the present invention sealing opposed axially facing but offset surfaces in an annulus between concentric pipes, one of the distal edges of the ring engaging the inner surface of the outer pipe to provide restraint against rotation in the counterclockwise direction as viewed in FIG. 1;

Figure 1:
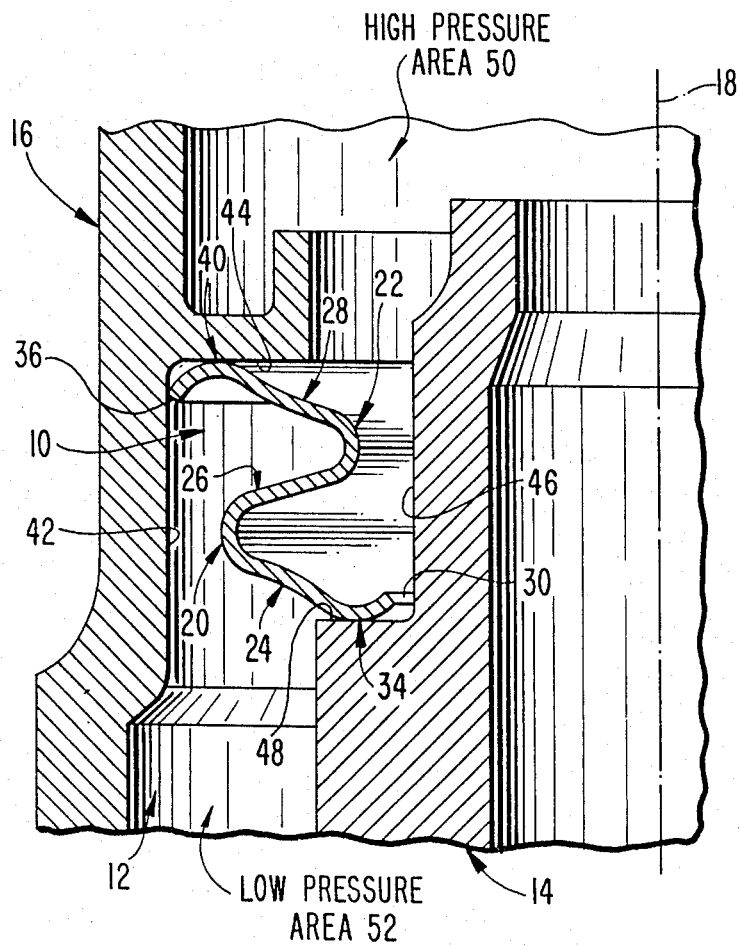
Figure 9:
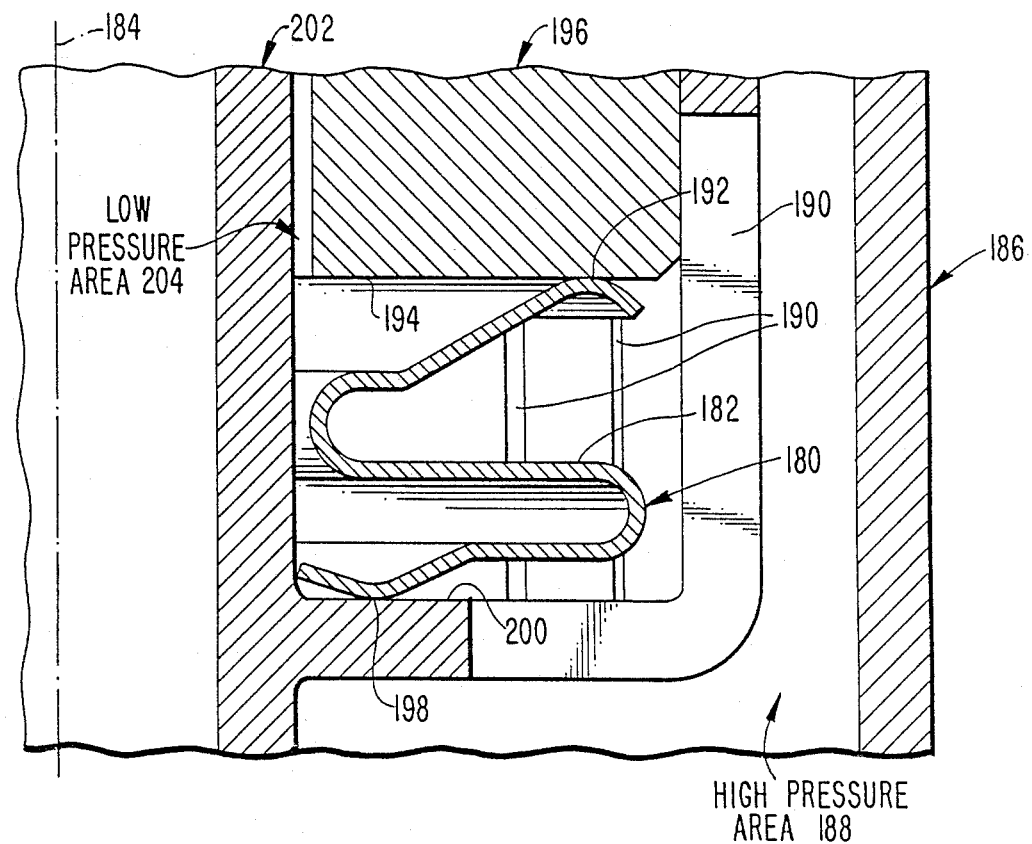
Figure 10:
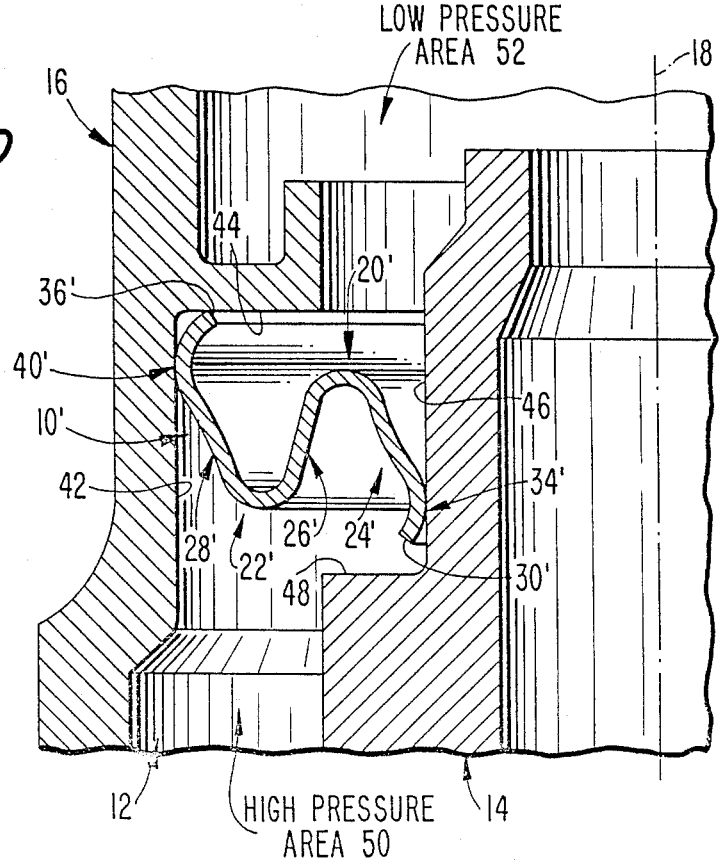

FIG. 9 is a fragmentary top plan view in longitudinal section of a further modified sealing ring in accordance with the invention in which the central leg is in a plane that is substantially perpendicular to the longitudinal axis of the sealing ring; and FIG. 10 is a fragmentary, top plan view in longitudinal section of a further modified sealing ring which is similar to that shown in FIG. 1 except that the legs, sealing lines and convolutions are rotated ninety degrees, the sealing ring is inverted, and the sealing lines engage opposed radially facing surfaces.

DETAILED DESCRIPTION OF THE INVENTION

Figure 2:
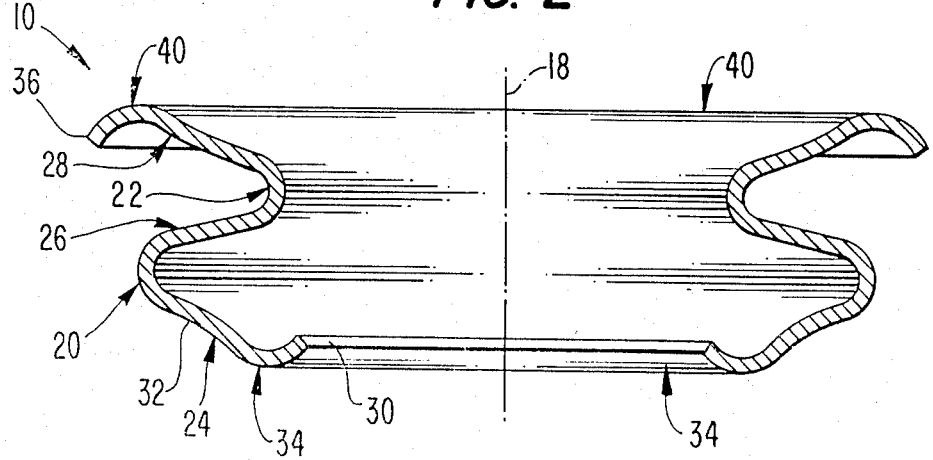
FIG. 2 is a top plan view in longitudinal section of the sealing ring in accordance with the invention shown in FIG. 1.

Referring now to FIGS. 1 and 2, the sealing ring 10 in accordance with the invention is shown sealing the annulus 12 between concentric inner pipe or housing 14 and outer pipe or housing 16, the annulus having a high temperature and/or pressure fluid on one side of the sealing ring.

The sealing ring 10 is preferably formed from metal such as a precipitation hardenable nickel based alloy, and has a substantially uniform thickness and a longitudinal axis 18. Typical material thickness, before forming, is about 0.25 mm±0.03 mm for a ring having a relaxed axial length of about 10.80 mm, a radial width of about 6.5 mm, and an outer diameter of about 263 mm. Such a ring can accept a pressure differential of about 1079 KPa (156 psi) and operate at about 758° C., preferably in an annulus, or cavity, having an axial length of about 10.26 mm. The ring has a substantially S-shaped, resilient, continuous cross section comprising a radially inwardly opening first convolution 20, a radially outwardly opening second convolution 22, a first leg 24 extending generally radially inwardly from the first convolution, a second leg 26 extending from the first convolution to the second convolution, and a third leg 28 extending generally radially outwardly from the second convolution.

Figure 3:
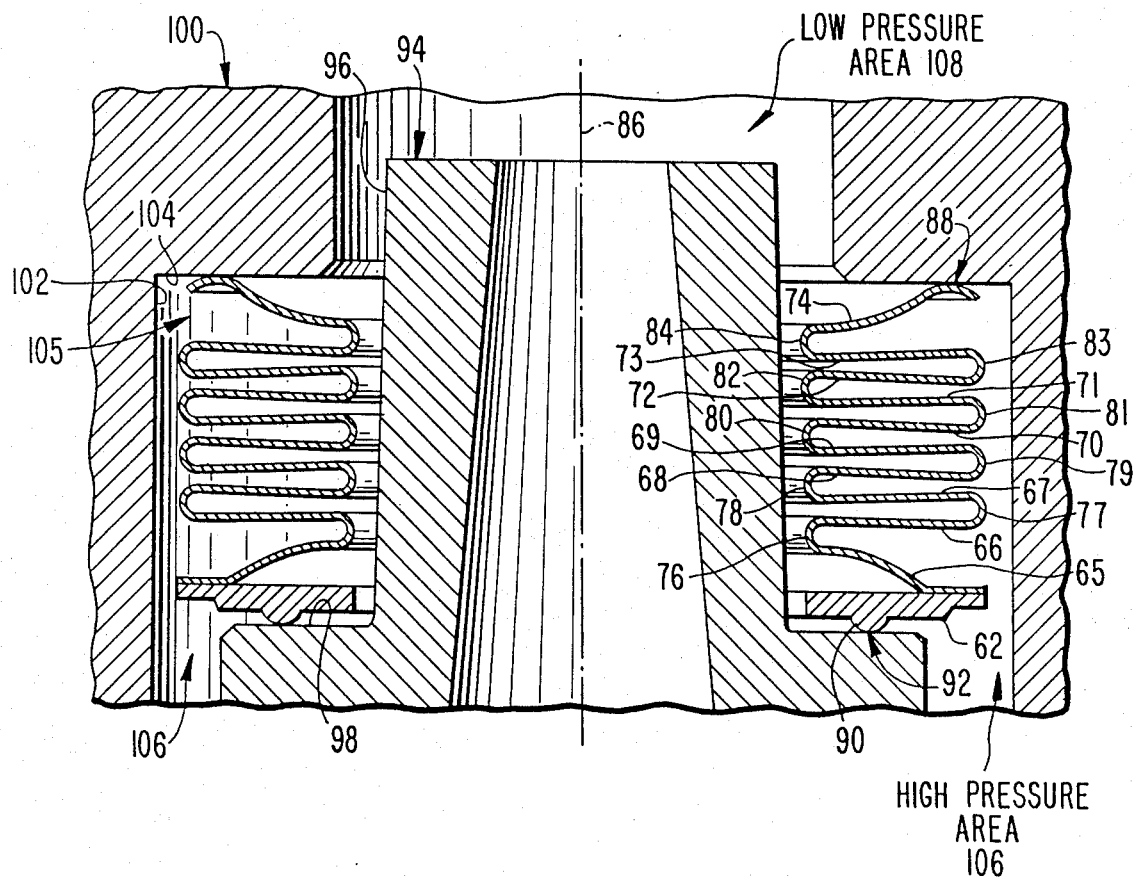
FIG. 3 is a fragmentary top plan view in longitudinal section of a modified sealing ring in accordance with the invention in which the sealing ring does not contact the radially facing surfaces of the inner or outer pipes, but rather is restrained via a restraining ring.

The first and second convolutions 20 and 22 are substantially U-shaped and lie in substantially parallel but axially offset planes. The first convolution 20 is spaced farther from the longitudinal axis 18 than the second convolution 22. While only two convolutions are shown in FIGS. 1 and 2, additional convolutions and legs can be used as illustrated in FIG. 3.

The first leg 24 is substantially frustoconical, tapers inwardly in a first axial direction and has a first free distal edge 30 thereon. The first leg 24 also has an outer surface 32 facing in the first axial direction including a convex portion defining a first substantially circular sealing line 34. This sealing line 34 is spaced from the first convolution 20 but is adjacent the distal edge 30.

The second leg 26 interconnects the first and second convolutions, is tapered inwardly in a second axial direction opposite from the first axial direction and is substantially frustoconical.

The third leg 28 has a second free distal edge 36 and is substantially frustoconical, tapering inwardly in the first axial direction. The third leg also has an outer surface 38 that faces in a second axial direction which is opposite from the first axial direction and includes a convex portion defining a second substantially circular sealing line 40. This second sealing line 40 is spaced from the second convolution 22 and is adjacent the second free distal edge 36.

As seen in FIGS. 1 and 2, the second sealing line 40 is spaced further from the longitudinal axis 18 than the first sealing line 34 and thus these sealing lines are radially offset and not axially aligned. The transverse plane containing the first sealing line is offset axially and substantially parallel to the transverse plane containing the second sealing line.

The second convolution 22 is spaced farther from the longitudinal axis 18 than the first distal edge 34 on the first leg, while the second distal edge 36 on the third leg is spaced farther from the longitudinal axis than the first convolution 20.

Referring to FIG. 1, the outer pipe 16 has a radially inwardly facing, substantially cylindrical inner surface 42 and an axially facing, annular surface 44. In the installed position shown in FIG. 1 the second distal edge 36 of the sealing ring 10 engages the inner surface 42 to aid in the pressure balancing of the sealing ring, and the second sealing line 40 is in sealing contact with the axially facing surface 44. Upon initial installation of the sealing ring 10 in annulus 12, there is preferably a small clearance between distal edge 36 and surface 42; however, this gap is at least partially spanned upon compression of the sealing ring when the entire assembly is made up. In all events, when the ring experiences pressurization, it will rotate sufficiently so that this gap is spanned and edge 36 engages surface 42.

The inner pipe 14 has a radially outwardly facing, substantially cylindrical outer surface 46 and an axially facing, annular surface 48, with the first distal edge 30 on the sealing ring being adjacent to the outer surface 46 and the first sealing line 34 being in sealing contact with axially facing surface 48.

As installed under slight axial compression as seen in FIG. 1, sealing ring 10 is intended to resist passage of high temperature and pressure liquid or gas from a high pressure area 50 to a low pressure area 52. Thus, with high pressure acting on the seal from area 50 it tends to rotate in the counterclockwise direction due to pressure acting on the inner surfaces of second leg 26 and first convolution 20. However, this counterclockwise rotation is resisted by contact of the second free distal edge 36 with the inner surface 42 on the outer pipe. With this counter rotation prevented, the high pressure in area 50 tends to pressure energize ring 10, i.e., tending to clockwise rotate the sealing ring and axially separate first and second legs 24 and 26, thereby driving the first sealing line 34 into a firmer engagement with surface 48 and the second sealing line 40 into a firmer engagement with surface 44. Due to this action, the sealing ring 10 is, in essence, in pressure balance and tends to resist leakage even under high pressure. Due to the various convolutions and tapered legs, the sealing ring accommodates large variations in installation length and remains effective after large numbers of pressure and thermal deflection cycles, since it resists deflection beyond its elastic limit and remains resilient.

Since the sealing lines 34 and 40 are radially offset, the sealing ring 10 effectively seals against the axially facing but offset surfaces 44 and 48. In addition, due to the S-shaped cross section, the sealing ring can accept torsional deflection as well as axial compression and expansion.

If the sealing ring 10 is dimensioned so that both edges 36 or 30 can engage their respective surfaces 42 or 46, the sealing ring can work regardless of which axial direction has the high pressure area.

Embodiment of FIG. 3

As seen in FIG. 3, a modified embodiment of the present invention is shown comprising a modified sealing ring 60 which has more than two convolutions and more than three legs therein as well as a restraining ring forming part of a first leg. This modified sealing ring 60 is especially advantageous when high resilence is necessary and where, due to dimensional requirements, one of the legs of the ring cannot engage and therefore restrain the sealing ring from counterclockwise rotation.

Sealing ring 60 is comprised of a restraining ring 62, ten legs 65–74 and nine convolutions 76–84 interconnecting the legs. In addition, a convolution is formed between leg 65 and restraining ring 62, which are suitably rigidly connected, such as by fusion welding. Each of the convolutions is substantially U-shaped and convolutions 77, 79, 81 and 83 are radially inwardly opening while convolutions 76, 78, 80, 82 and 84 are radially outwardly opening. Legs 66–73 are substantially parallel to one another and each is contained in a plane substantially perpendicular to the longitudinal axis 86 of seal 60.

Leg 74 extends substantially radially outwardly and is substantially frustoconical, having a circular sealing line 88 defined by a substantially convex portion on an outer surface thereof. Leg 65 extends substantially radially inwardly and is substantially frustoconical. Restraining ring 62 extends radially, is substantially annular and has an annular rib 90 on its outer surface defining a sealing line 92 thereon at a substantially convex outer surface on the rib.

Sealing ring 60 is used in conjunction with an inner pipe 94 having a radially outwardly facing, annular outer surface 96 and an axially facing annular surface 98, as well as an outer pipe 100 having a radially inwardly facing, annular inner surface 102 and an axially facing annular surface 104. Ring 60 is located in annulus 105 between the pipes.

As installed in FIG. 3, the sealing ring 60 is slightly axially compressed so that sealing line 88 is in sealing contact with axially facing surface 104 and sealing line 92 is in sealing contact with axially facing surface 98. Because of dimensional requirements, a free distal edge of the sealing ring 60 cannot directly engage one of the inner or outer surfaces of the inner or outer pipes. In this case, assuming that there is a high pressure area 106 and a low pressure area 108 acting on sealing ring 60, there is no physical contact to resist the rotation of the sealing ring away from its sealing engagement.

However, due to the hoop strength and torsional stiffness of the restraining ring 62, this unsealing rotation will be resisted and instead the sealing ring legs and convolutions will essentially rotate relative to the restraining ring in a sealing direction. Thus, sealing ring 60 is pressure energized and sealing line 88 is more firmly engaged with surface 104 and sealing line 92 is more firmly engaged with surface 98 under the influence of the high pressure area 106 as described above for ring 10.

Figure 4:
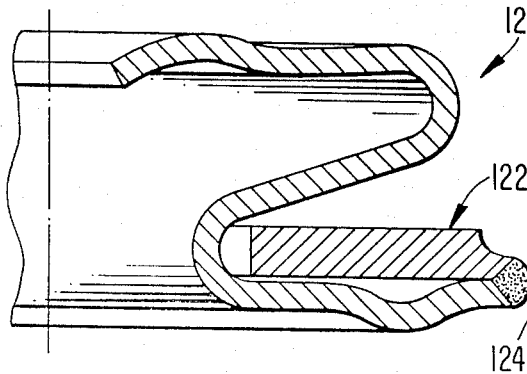
FIG. 4 is a fragmentary top plan view in longitudinal section of a modified sealing ring in accordance with the invention in which a restraining ring is rigidly coupled adjacent the inner surface of one leg of the sealing ring.

Embodiment of FIG. 4

As seen in FIG. 4, a modified sealing ring 120 is illustrated which is similar to sealing ring 10 shown in FIGS. 1 and 2 except that it has a radially extending restraining ring 122 rigidly coupled adjacent the inner surface of one of the outer legs via a circular weld line 124. This structure is utilized in a situation where one of the distal edges of the sealing ring leg cannot engage the inner or outer surfaces of concentric pipes. Thus sealing ring 120 is utilized in a situation similar to that described above regarding FIG. 3 and the restraining ring 122 performs substantially the same purpose as restraining ring 62.

As seen in FIG. 4, restraining ring 122 is located adjacent the inner surface of one of the legs on the ring to conserve axial space. Other than the addition of the restraining ring 122 and the differences in configuration between sealing ring 10 and sealing ring 120 seen by comparing FIGS. 1 and 4, sealing ring 120 is substantially the same as sealing ring 10.

Figure 5:
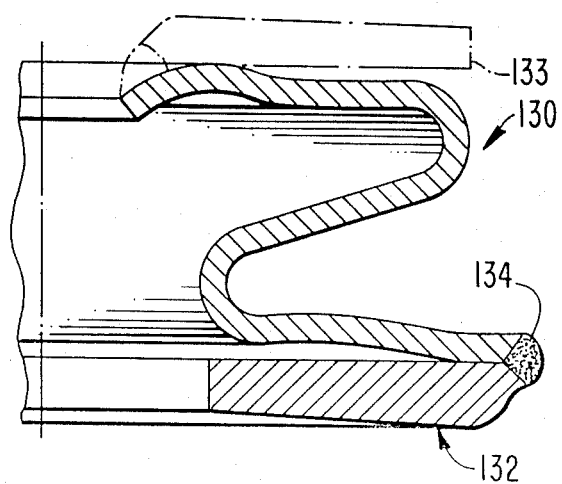
FIG. 5 is a fragmentary top plan view in longitudinal section of a modified sealing ring in accordance with the invention in which a restraining ring is rigidly coupled adjacent the outer surface of one leg of the sealing ring.

Embodiment of FIG. 5

As seen in FIG. 5, a modified sealing ring 130 in accordance with the invention is illustrated, sealing ring 130 being substantially the same as sealing ring 120 except that the restraining ring 132 is rigidly coupled to the ring via circular weld line 134 on the outer surface of one of the outer legs of ring 130. This configuration is easier to make than ring 120 and is utilized when there is significant axial space in the cavity or annulus to be sealed, sealing ring 130 working substantially the same as sealing ring 120.

Figure 6:
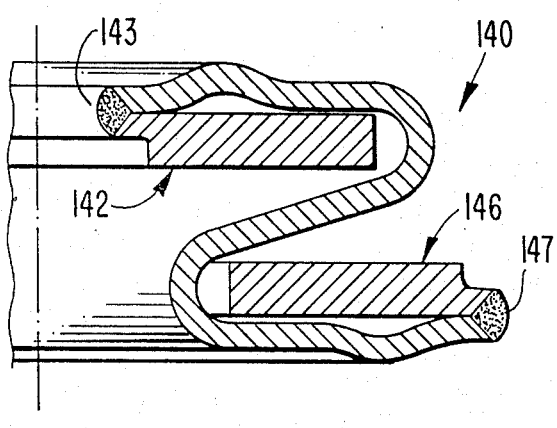
FIG. 6 is a fragmentary top plan view in longitudinal section of a modified sealing ring in accordance with the invention in which two restraining rings are rigidly coupled adjacent the inner surfaces of two legs of the sealing ring.

Embodiment of FIG. 6

As seen in FIG. 6, a modified sealing ring 140 in accordance with the invention is illustrated utilizing a first restraining ring 142 rigidly coupled adjacent the inner surface of one of the outer legs via a circular weld line 143 and a second restraining ring 146 rigidly coupled adjacent the inner surface of a second outer leg via circular weld line 147. Sealing ring 140 works substantially the same as sealing rings 120 and 130 but tends to increase its sealing engagement under pressurization due to axially directed forces rather than rotational forces because it has two restraining rings, and is similarly constructed except for the addition of a second restraining ring. The second restraining ring is added so that the sealing ring 140 can resist deleterious counterclockwise or clockwise rotation depending upon the location of high pressure in the cavity it seals. In this regard, the area of high pressure could alternate between one side and the other.

As illustrated in FIG. 4, the restraining rings 142 and 146 are located adjacent the inner surfaces of the legs to conserve axial space.

Figure 7:
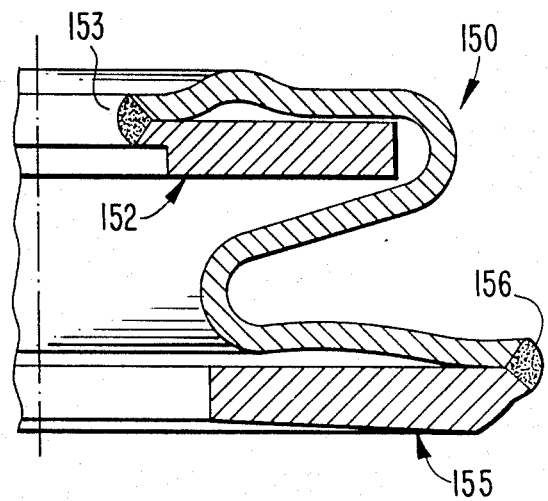
FIG. 7 is a fragmentary top plan view in longitudinal section of a modified sealing ring in accordance with the invention in which a restraining ring is rigidly coupled adjacent the outer surface of one leg and a second restraining ring is rigidly coupled adjacent the inner surface of another leg on the ring.

Embodiment of FIG. 7

As seen in FIG. 7, a modified sealing ring 150 in accordance with the invention is illustrated with is similar to that shown in FIG. 6 except that a first restraining ring 152 is rigidly coupled adjacent the inner surface of one leg via circular weld line 153 and a second restraining ring 155 is rigidly coupled adjacent the outer surface of the second leg via circular weld line 156. This configuration of sealing ring 150 conserves axial space via use of ring 152 adjacent the inner surface of one leg while allowing the second restraining ring 155 to be placed adjacent the outer surface. Sealing ring 150 works substantially the same as sealing ring 140.

As shown in phantom lines in FIG. 5, a sealing ring can be configured with restraining rings coupled adjacent the outer surfaces of both of the outer legs. The sealing ring includes the addition of a second restraining ring 133 similar to ring 132 but adjacent the outer surface of the upper outer leg.

Figure 8:
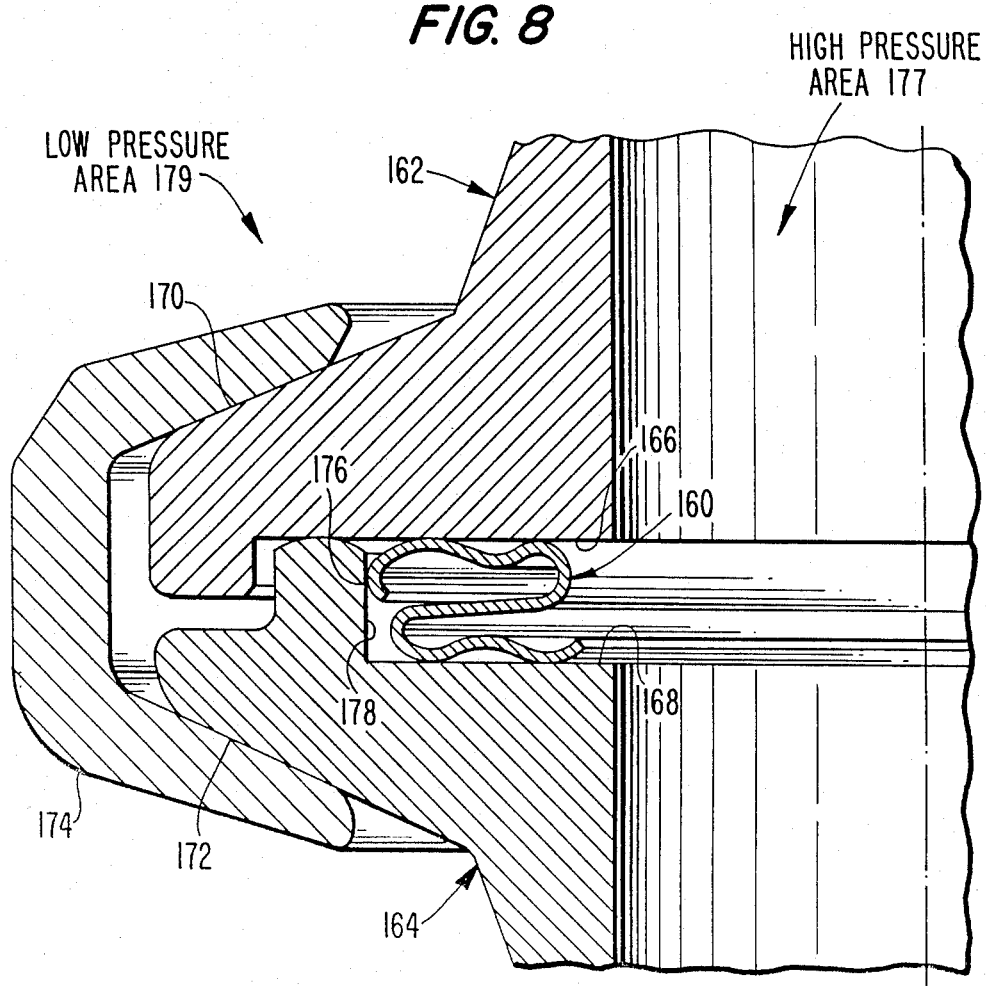
FIG. 8 is a fragmentary top plan view in longitudinal section of the sealing ring in accordance with the invention used with two aligned, axially facing and opposed surfaces to seal the interface therebetween.

Embodiment of FIG. 8

As illustrated in FIG. 8, sealing ring 160 is used to seal the interface between opposed axially aligned first and second pipes 162 and 164. Sealing ring 160 is configured substantially the same as sealing ring 10 shown in FIGS. 1 and 2 and seals against axially facing surface 166 on the first pipe 162 and axially facing surface 168 on the second pipe 164, these axially facing surfaces being aligned, i.e., not radially offset. These pipes are connected and form an annular interface protected by sealing ring 160 via radially outwardly extending flanges 170 and 172 which are coupled via an annular clamp 174. Since the outer edge 176 on the sealing ring 160 engages the radially inwardly facing surface 178 on the first pipe 164, the sealing ring 160 is restrained and therefore will not be rotated in a direction tending to foster leakage. Rather, the sealing ring will be pressure balanced as discussed above regarding sealing ring 10 when acted on by high pressure area 177, area 179 being at low pressure.

Embodiment of FIG. 9

As shown in FIG. 9, a modified sealing ring 180 in accordance with the invention is illustrated, this sealing ring being substantially the same as that illustrated in FIGS. 1 and 2 except that a central or third leg 182 lies in a plane that is substantially perpendicular to the longitudinal axis 184 of the sealing ring.

In this embodiment, the entire structure is enclosed by a casing 186 having a high pressure area 188 therein. The high pressure liquid or gas in area 188 acts on sealing ring 80 through slots 190; however, sealing ring 180 remains pressure balanced with sealing line 192 on one outer leg firmly engaging an axially facing surface 194 on a first pipe 196 and a second sealing line 198 on the second outer leg firmly engaging axially facing surface 200 on a second pipe 202.

Thus, the fluid in the high pressure area 188 is confined to that area and the second area 204 on the other side of sealing ring 180 remains at a low pressure.

Embodiment of FIG. 10

As shown in FIG. 10, a modified sealing ring 10' is illustrated which is substantially the same as sealing ring 10 shown in FIGS. 1 and 2 except the legs, sealing lines and convolutions are rotated through ninety degrees and the ring is inverted. This orientation can be used to accommodate annulus configurations in which ring 10 is unsuitable. The inner and outer pipes 14 and 16 remain the same as in FIG. 1 and are given the same reference numerals, as are the various surfaces on these pipes. The parts of sealing ring 10' are the same as those on ring 10 and are given the same reference numerals with the addition of a prime. In FIG. 10, the low pressure area 52 is at the top and the high pressure area 50 is at the bottom, which is reversed from FIG. 1.

Thus, in FIG. 10, the convolutions 20' and 22' are oppositely axially facing and offset with the second convolution 22' being spaced farther from the longitudinal axis 18 than the first convolution 20'. First leg 24' extends generally axially and has a sealing line 34' facing radially inwardly, and second leg 28' extends generally axially and has a sealing line 40' facing radially outwardly. Sealing line 40' is spaced farther from axis 18 than sealing line 34', and these sealing lines are axially offset and lie in substantially parallel planes which are perpendicular to axis 18. As with sealing ring 10, sealing lines 34' and 40' are adjacent the first and second free distal edges 30' and 36', and the first and second legs 24' and 28' each have outer surfaces including a convex portion defining, respectively, these sealing lines.

In this embodiment, the second distal edge 36' engages axially facing annular surface 44 on the outer pipe to resist clockwise rotation of the sealing ring 10' cross section shown in FIG. 10, and first sealing line 34' engages outwardly facing cylindrical surface 46 while second sealing line 40' engages inwardly facing cylindrical surface 42.

Thus, once the high pressure area 50 acts on sealing ring 10', the ring is pressure energized, as is sealing ring 10, through the engagement of edge 36' with surface 44 and the configuration of the ring and annulus 12 in a manner similar to that discussed above for ring 10.

The first distal edge 30' is spaced from annular surface 48, although it could be made to engage that surface, after installation or pressurization of the sealing ring, so that sealing ring 10' could work according to the invention if the high and low pressure areas 50 and 52 were reversed.

While various advantageous embodiments have been chosen to illustrate the invention, it will be understood by those skilled in the art that various changes and modifications can be made therein without departing from the scope of the invention as defined in the appended claims.

What is claimed is:

1. A sealing ring, the combination comprising:
    a ring having a longitudinal axis and a resilient and continuous cross section,
    said cross section comprising
        a first convolution opening in a first axial direction,
        a second convolution opening in a second axial direction opposite said first axial direction,
        a first leg extending generally in said first axial direction from said first convolution and having a first free distal edge,
        a second leg extending from said first convolution to said second convolution, and
        a third leg extending generally in said second axial direction from said second convolution and having a second free distal edge,
    said second convolution being spaced farther from said longitudinal axis than said first convolution,
    said first leg having an outer surface defining a first substantially circular sealing line facing generally radially inwardly and being spaced from said first convolution,
    said third leg having an outer surface defining a second substantially circular sealing line facing generally radially outwardly and being spaced from said second convolution,
    said second sealing line being axially offset along said longitudinal axis from said first sealing line.

2. A sealing ring according to claim 1, wherein
    said first sealing line is adjacent said first free distal edge, and said second sealing line is adjacent said second free distal edge.

3. A sealing ring according to claim 1, wherein
said first leg outer surface includes a convex portion defining said first sealing line, and
said third leg outer surface includes a convex portion defining said second sealing line.

4. A sealing ring according to claim 1, wherein said cross section is substantially S-shaped.

5. A sealing ring for sealing two members relative to one another and having inner and outer surfaces, the combination comprising:
 a ring having a longitudinal axis and a resilient and continuous cross section,
 said cross section comprising
  a first convolution opening in a first axial direction,
  a second convolution opening in a second axial direction opposite said first axial direction,
  a first leg extending generally in said first axial direction from said first convolution and having a first free distal edge,
  a second leg extending from said fist convolution to said second convolution, and
  a third leg extending generally in said second axial direction from said second convolution and having a second free distal edge,
 said second convolution being spaced farther from said longitudinal axis than said first convolution,
 said first leg having an outer surface defining a first substantially circular sealing line facing generally radially inwardly and being spaced from said first convolution,
 said third leg having an outer surface defining a second substantially circular sealing line facing generally radially outwardly and being spaced from said second
 said second sealing line bing axially offset along said longitudinal axis from said first sealing line and radially offset from said first sealing line relative to said longitudinal axis, and
 one of said free distal edges being adapted to abut one of the members when said sealing ring is subjected to higher relative pressure on one of said inner and outer surface than on the other of said inner and outer surfaces.

6. A sealing ring according to claim 5, wherein
said first sealing line is adjacent said first free distal edge, and
said second sealing line is adjacent said second free distal edge.

7. A sealing ring according to claim 5, wherein
said first leg outer surface includes a convex portion defining said first sealing line, and
said third leg outer surface includes a convex portion defining said second sealing line.

8. A sealing ring according to claim 5, wherein
said cross section is substantially S-shaped.

* * * * *